(12) United States Patent
Kees

(10) Patent No.: US 7,775,501 B2
(45) Date of Patent: Aug. 17, 2010

(54) PINCH VALVE

(75) Inventor: Ulrich Kees, Homburg (DE)

(73) Assignee: Festo AG & Co., Esslingen (DE)

( * ) Notice: Subject to any disclaimer, the term of this patent is extended or adjusted under 35 U.S.C. 154(b) by 391 days.

(21) Appl. No.: 11/974,010

(22) Filed: Oct. 11, 2007

(65) Prior Publication Data

US 2008/0087853 A1      Apr. 17, 2008

(30) Foreign Application Priority Data

Oct. 13, 2006      (DE) ........................ 10 2006 048 573

(51) Int. Cl.
*F16K 7/04* (2006.01)
(52) U.S. Cl. ............................................. 251/7; 251/5
(58) Field of Classification Search ............ 251/4, 251/5, 7, 8
See application file for complete search history.

(56) References Cited

U.S. PATENT DOCUMENTS

| 3,830,462 | A | 8/1974 | Henfrey |
| 7,168,444 | B2 * | 1/2007 | Sesser et al. ........... 137/505.25 |

FOREIGN PATENT DOCUMENTS

| DE | 2243 173 | 3/1973 |
| DE | 75 00 720 | 3/1976 |
| DE | 2941278 | 4/1980 |
| DE | 33 18 817 A1 | 12/1983 |
| DE | 29 41 278 C2 | 4/1984 |
| DE | 3445740 | 6/1986 |
| FR | 2152061 | 4/1973 |
| GB | 1402266 | 8/1975 |
| JP | 58046271 | 3/1983 |

OTHER PUBLICATIONS

"Mechanische Quetschventile Typ BSV/Mechanical Pinch Valves Type BSV", AKO Armaturen & Separations GmbH, D-65468 Trebur-Astheim Oct. 2001.

* cited by examiner

*Primary Examiner*—John K Fristoe, Jr.
(74) *Attorney, Agent, or Firm*—Hoffman & Baron, LLP

(57) ABSTRACT

A pinch valve has a hose-like valve member with a flexible peripheral wall adjacent to whose outer periphery two diametrally opposite pinch elements are arranged able to be moved toward and away from one another with a greater or lesser pinching of the peripheral wall while performing an operating movement athwart the valve member longitudinal axis. An annular actuating ring coaxially surrounding the valve member may act on the pinch elements for causing the operating movement. The actuating ring is placed in a working space surrounded radially from the outside by a peripheral valve housing wall and is able to be acted on by drive means separate from the actuating ring with a drive force controlling the actuating movement.

25 Claims, 5 Drawing Sheets

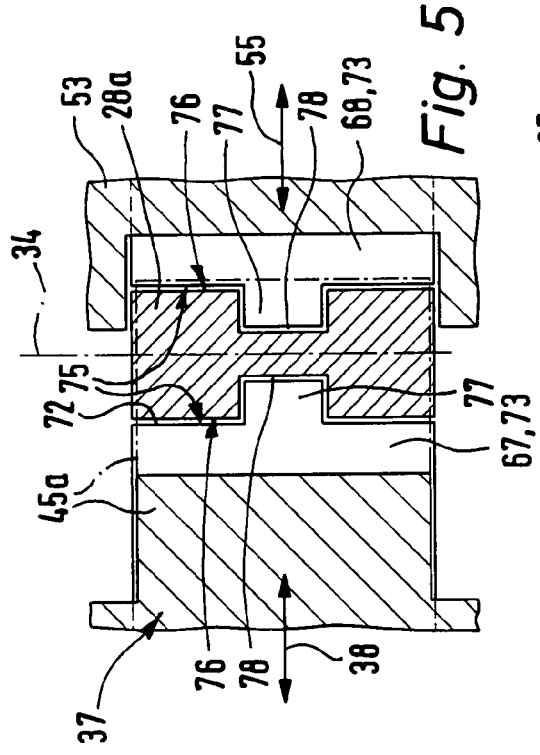
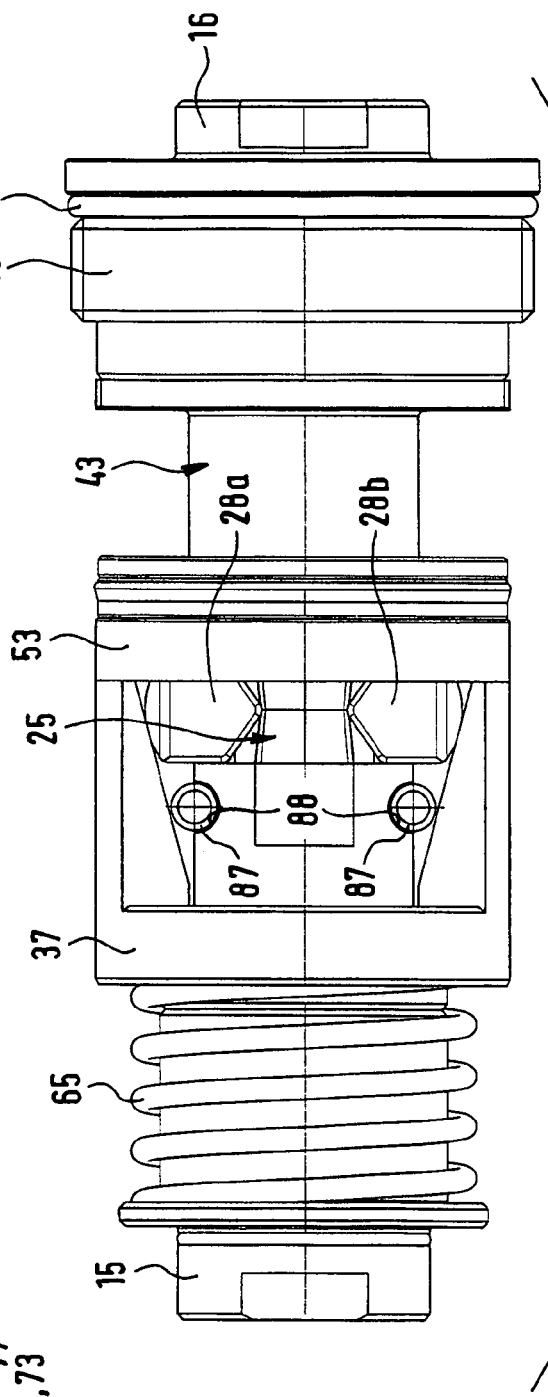

PINCH VALVE

The invention relates to a pinch valve comprising a hose-shaped valve member having a flexible peripheral wall and extending between two unions, said valve member defining a passage duct for a fluid and at its outer periphery possessing two pinch elements which are opposite to each other diametrally as related to the valve member longitudinal axis and are able to be shifted toward and away from each other for a lesser or greater pinching of the peripheral wall while performing an operating movement athwart the valve member longitudinal axis, and furthermore, surrounding the valve member, an actuating member having actuating faces fitting radially to the outside over the pinch elements, said faces being oblique in relation to the valve member longitudinal axis, said actuating member being able to be shifted along the valve member while performing an actuating movement in order to cause the operating movement with its actuating faces on the pinch elements, the pinch elements being capable of thrusting together mutually opposite sections of the peripheral wall toward each other in a fluid-tight manner in order to close the passage duct.

A pinch valve disclosed in the German patent publication DE 2941278 of this type is designed in the form of a injection needle union employed for medical purposes. It comprises a hose-like valve member for a fluid, on whose outer periphery two movable pinch elements are arranged encompassed by a clamp-like actuating member. The actuating member is designed in the form of a manually operated slide having oblique actuating faces for engaging the pinch elements and whose operation entails a shifting of the pinch elements together so that the valve member is locally pinched and the passage of the fluid is accordingly reduced or is completely shut off.

A similar arrangement is described in the German patent publication DE 7500720 U. In one possible embodiment the actuating member is in the form of a sliding sleeve and as a valve member a hose inserted in a hole is employed. The actuation of the actuating member again takes place manually.

In the case of the pinch valve disclosed in the German patent publication DE 3318817 A1 as well manual operation of the hose-like valve member is provided for. By way of a sliding and rotatable cam rod a thrust member may be acted upon in order to nip the valve member to a greater or lesser extent.

These prior art pinch valves are admittedly well adapted for completely manual operation. However power actuation, as for example by means of a pneumatic drive technique is not possible. Such a method is however to be aimed at in cases involving remote controlled activation and more particularly in the case of process technology, or in cases in which reliable operation is to be ensured with high pressures of the fluid flowing through the valve.

Admittedly in this respect product information sheets entitled "Mechanische Quetschventile Typ BSV/Mechanical Pinch Valves Type BSV" published by AKO Armaturen & Separations GmbH, of D-65468 Trebur-Asthheim, issued October 2001, have disclosed pneumatic pinch valves in which the closing force is produced by spring and opening by means of compressed air. However owing to the mounting of the drive means to the side of the valve housing this known design is extremely bulky.

The German patent publication DE 22 43 173 A also discloses a pinch valve operated by fluid force. In the case of the working example described with reference to FIGS. 10 and 11 a hose-like valve member is surrounded by a pinch ring made of rubber and able to be deformed radially by an axially sliding actuating ring. The actuating force of the actuating ring us transmitted by balls to the pinch ring. Closure of the passage duct is performed by the pinch ring thrusting the peripheral wall of the valve member against the outer periphery of a spherical closure member. Since this closure member is arranged in the interior of the passage duct, even in the open state of the pinch valve there is a hinderance to flow limiting the flow rate. Furthermore the limited deformability of the flexible pinch ring there restricts the maximum duct cross section able to be made available for fluid flow. Last but not least the axially moving actuating ring is freely accessible from the outside and this entails certain likelihood of fouling and of injury.

One objective of the present invention is to create a pinch valve suitable for the application of higher actuating forces and having compact dimensions.

In order to achieve this aim in the case of a pinch valve of the type initially mentioned the actuating member is in the form of an actuating ring coaxially surrounding the valve member and located in an annular working space radially externally surrounded by a peripheral valve housing wall, separate drive means being present for the actuating ring by which the actuating ring is able to be acted upon by a drive force in control of the actuating movement.

The annular design of the actuating member facilitates symmetrical application of the force and this is an advantage in the case of heavy setting forces. Owing to accommodation in a working space the actuating ring is screened off from the surroundings so that the danger of injury and soiling is reduced. Owing to the arrangement, which is coaxial to the valve member, the actuating ring there is the possibility of designing a pinch valve with quite small dimensions athwart the valve member longitudinal axis. The drive means, separate from the actuating ring, render possible the application of a drive force, which if necessary is substantial, to the actuating ring, a direct manual action on the actuating ring being avoided.

Further advantageous developments of the invention are defined in the dependent claims.

Preferably the drive means are so designed that they act on the actuating ring with a fluid force. A pneumatic design is preferred. However in principle other drive mechanisms would be conceivable, as for example electromagnetic ones and/or actuation with a lever transmission.

In conjunction with fluid drive means in the working space a drive chamber is arranged preferably axially adjacent to the actuating ring and is able to be supplied in a controlled fashion with a drive fluid acting directly or indirectly on the actuating ring.

The fluid actuation is more particularly by way of a control duct which extends through the housing of the pinch valve to the outer face and may have has an outer duct opening provided with connection means for a fluid line.

An indirect fluid operation of the actuating member by means of an additional drive piston is preferred. The drive piston can be optimally sealed off as regards the valve housing so that no sealing means are necessary on the actuating ring and it may be optimally designed for the actuating function.

The actuating piston may admittedly be permanently connected with the actuating ring and constitute a single unit with it. However a design is preferred in which the drive piston is a component separate from the actuating ring able, in particular, to be slid independently of the actuating ring. In this case the drive piston may normally only exert thrust forces but not tension forces on the actuating ring. The de-coupling so involved here permits mutually independent relative movements athwart the valve member longitudinal axis between the two component so that reaction forces resulting from the redirection of the force into the pinch elements, are kept clear of the drive piston and its seals and its sliding faces are not subjected to increased wear.

Preferably the actuating ring comprises an annular base body, from whose one end face two diametrically opposite actuating vanes extend away axially and on which the actuating faces are arranged and which overlap the pinch elements. Accordingly there is a precise slide guide means for the actuating ring with a maximum economy in the use of materials at the same time.

A spring means also accommodated in the working chamber can provide for a spring return force acting oppositely to the fluid drive force. The spring means is best arranged coaxially in relation to the valve member and accordingly as an axial extension of the actuating ring. It is located preferably on the side, opposite to the drive space of the actuating ring.

By means of the spring means the actuating ring may be biased toward a home position from which a corresponding home position of the pinch elements results. This home position is preferably a shut position in which the pinch elements nip the peripheral wall of the valve member so far that the passage of fluid through the fluid duct running through the valve member is interrupted.

Particularly simple manufacture is possible if the working space is circularly cylindrical and does not have any steps in its longitudinal direction. This means that the individual components may also be quite simply installed in an axial direction.

In order to prevent uncontrolled inflation of the hose-like valve member owing to the fluid pressure in it, it is preferably coaxially surrounded at its flexible peripheral wall by a hose-like supporting means. The internal cross section of the supporting means thus sets the maximum flow cross section of the valve member.

In a preferred design the supporting means comprises two supporting sleeves whose mutually facing end faces define a guide gap wherein the pinch elements are guided in a radially sliding manner for performing their operating movement.

The guide means are preferably so designed that there is linear guidance of the pinch elements to provide simultaneously for a support for the pinch elements at a right angle to the operating movement and to the valve member longitudinal axis so that the pinch elements are steadied in the relative position as regards the valve member without a possibility of skew movement either.

The valve housing wall delimiting the working space peripherally preferably has a circularly cylindrical shape. Preferably it is a furthermore a component of a sleeve-shaped socket body receiving the rest of the components of the pinch valve. Such components may more especially be so designed that they are able to be inserted in an axial direction into the socket body. In this respect it is an advantage if some of the valve components are joined together as a subassembly able to be inserted axially into the socket body. Any spring means present is preferably a component of this subassembly, it being possibly biased within the subassembly so that during the insertion operation itself no time-consuming tensioning of the spring means is necessary.

For securing in relation to the housing and simultaneous sealing of the valve member to the unions it is possible for an attachment flange with sealing means to be present on both axial ends of the valve member. This flange is preferably biased in an axial direction toward an axially orientated mating flange on the respectively associated union.

The valve member is preferably a rubber-elastic molding with a configuration departing from a completely circularly cylindrical shape in the unloaded initial state. Preferably the peripheral wall is so formed that solely owing to its inherent dimensional stability it possesses a configuration tapering axially from the outside toward the engagement portion of the pinch elements. The peripheral wall can be flattened in its peripheral section cooperating with the pinch elements, something which is more particularly an advantage when the pinch section of the pinch elements touching the valve member has a linear extent athwart the direction of the operating movement. Accordingly excessive deformation of the peripheral wall of the valve member may be avoided.

The valve member is preferably all in all of a unitary molding consisting of a material with rubber-elastic properties. As a material in particular an elastomeric one may be used.

In the following the invention will be explained with reference to the accompanying drawings in detail.

FIG. 5 represents part of the pinch valve as in FIG. 1 taken on the section line V-V.

FIG. 6 shows components of the pinch valve put together as a subassembly prior to insertion in a sleeve-shaped socket body belonging to the valve housing.

Figure 1:
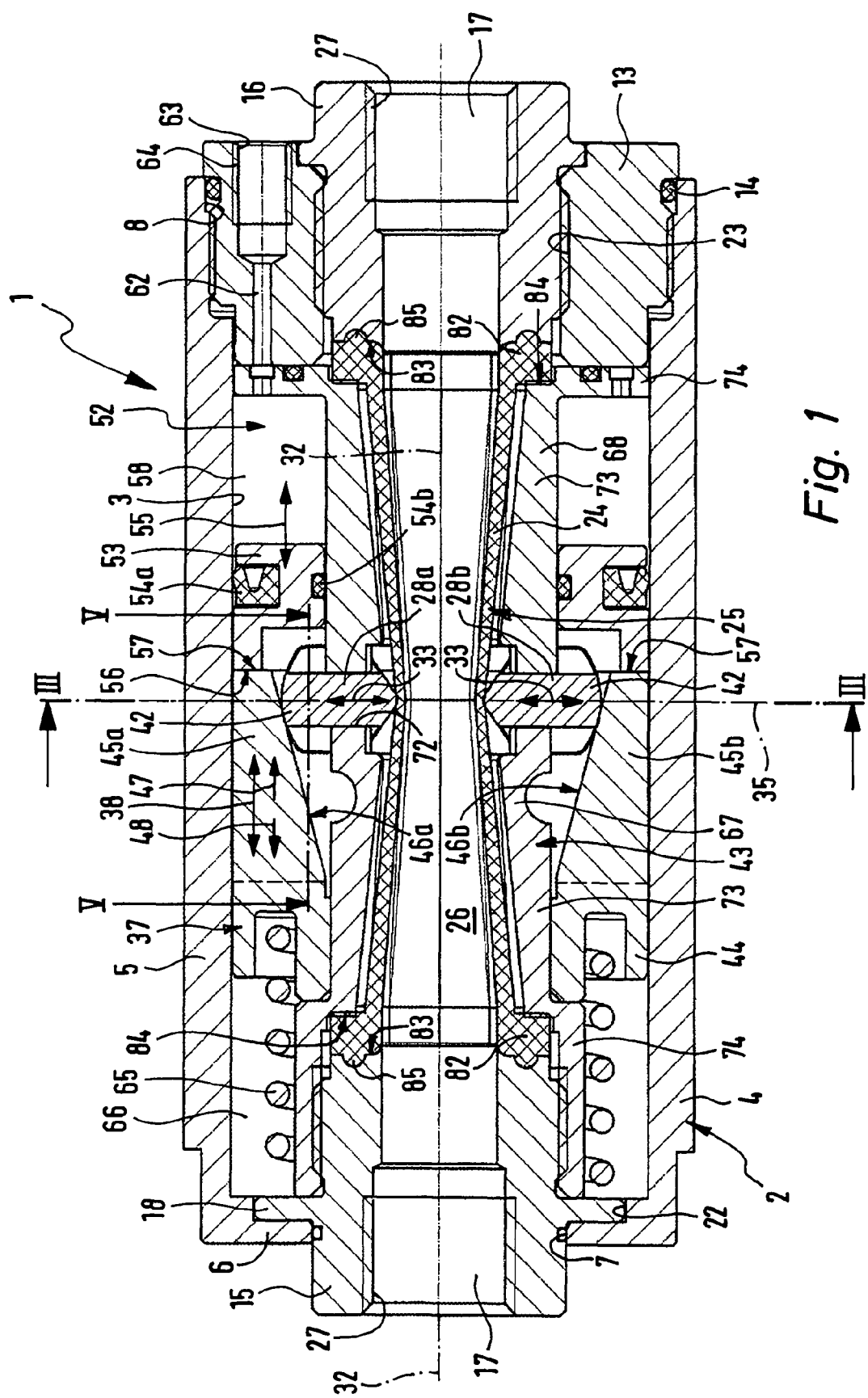
FIG. 1 shows a preferred first design of the novel pinch valve in the wide open position and in a longitudinal section taken on the section line I-I of FIG. 3.

The pinch valve generally referenced 1 comprises a valve housing 2 whose inner space defines a working space 33 with a circularly cylindrical shape and preferably devoid of steps in its axial direction.

One component of the valve housing 2 is a sleeve-shaped socket body 4 which defines an essentially cylindrical valve housing wall 5 delimiting the working space 3 peripherally.

At an end face the peripheral valve housing wall 5 is adjoined by a floor wall 6 in the form of a perforated disk with a central opening 7

It as well preferably a component of the sleeve-shaped socket body 4.

The end face, opposite to the floor wall 6, of the valve housing wall 5 defines an assembly opening 8. Through this opening the further components of the pinch valve 1 are inserted into the socket body 4.

These further components are also illustrated separately in FIG. 6. They are here depicted together as an assembly unit generally referenced 12 and able to be inserted through the assembly opening 8 bodily into the socket body 4.

A terminating element 13 inserted, more particularly by screwing, in the assembly opening 8 constitutes the end limit, axially opposite to the floor wall 6, of the working space 3. In the actual example the terminating element 13 has a male thread for it to be screwed into a female thread section in the assembly opening 8. An intermediately placed sealing ring 14 provides for a fluid-tight joint.

At the two axial end sections of the valve housing 2 there is a first and a second union 15 and 16. Both unions 15 and 16 have a separate fluid duct 17 extending through them.

Preferably the first union 15 bears against the axially orientated inner face of the floor wall 6 and fits through the central opening 7. For support there is a radially projecting support flange 18 fitting into a recess 22 in the floor wall 6 with a centering action.

The second union 16 is preferably inserted into the terminating element 13. The latter may be in the form of an annular body and have a centrally arranged axial opening 23 having a female thread with the male thread of the second union 16 screwed into it.

Between the two unions 15 and 16 there extends a hose-like valve member 25 with a flexible peripheral wall 24. The valve member is joined with the two unions 15 and 16 in a fluid-tight manner and defines with a through duct 26, surrounded by the peripheral wall 24 and communicating with the fluid ducts 17 in the two unions 15 and 16.

Via one respective union 15 or 16 the fluid pressure medium to be controlled may enter to pass through the through the duct 26 to the respectively other union 16 or 15 before leaving the pinch valve 1 through it. Attachment means 27 arranged on the two unions 15 and 16 and for example in the form of female threads in the fluid ducts 17, permit the connection of fluid ducts to let in and let off the fluid to be controlled.

At the outer periphery of the peripheral wall 24 of the valve member 25 two pinch elements 28a and 28b are arranged. As considered in the direction of the valve member longitudinal axis 32 there are at the same axial level and are diametrally opposite each other as related to the valve member longitudinal axis 32. Both pinch elements 28a and 28b may be shifted independently of each other transversely and more particularly at a right angle to the valve member longitudinal axis 32, the movements being termed operating movements 33, which are indicated in the drawing by double arrows.

The operating movements 33 are preferably linear movements with coinciding alignments.

Figure 3:
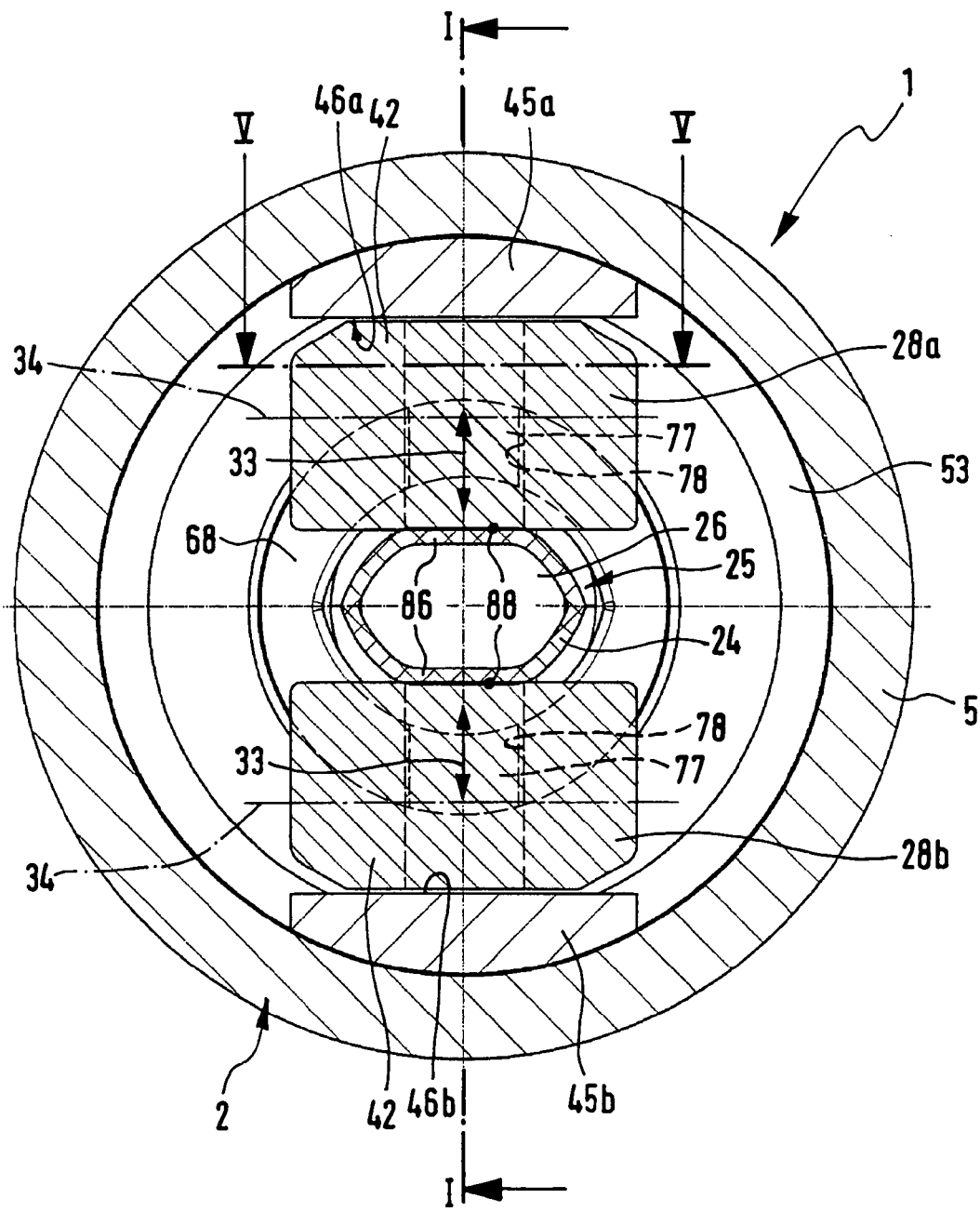
FIG. 3 is a cross section on the section line III-III taken through the pinch valve of FIG. 1.
Figure 4:
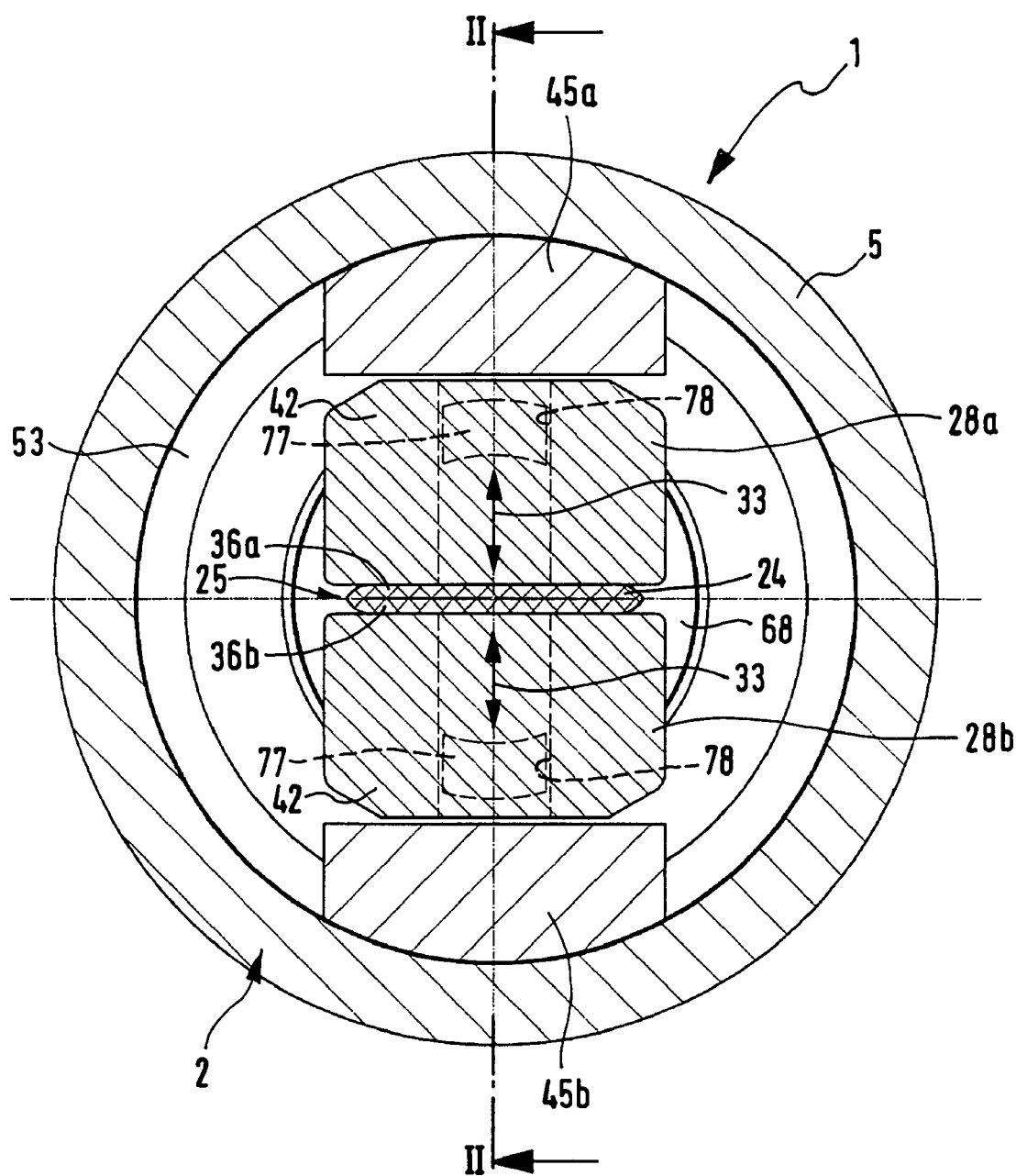
FIG. 4 is a cross section taken on the section line IV-IV through the pinch valve depicted in FIG. 2.

As shown more especially in FIGS. 3 through 5 the pinch elements 28a and 28b are in the form of length elements with a longitudinal axis 14 normal to the axial direction of the operating movement 33 and to the valve member longitudinal axis 32. Thus the pinch elements 28a and 28b are shifted in their operating movements 33 in a common radial plane 35 perpendicular to the valve member longitudinal axis 32.

The pinch elements 28a and 28b serve to provide a stronger or weaker pinching of the peripheral wall 24. Their movement always takes place in opposite directions, either toward or away from each other.

Figure 2:
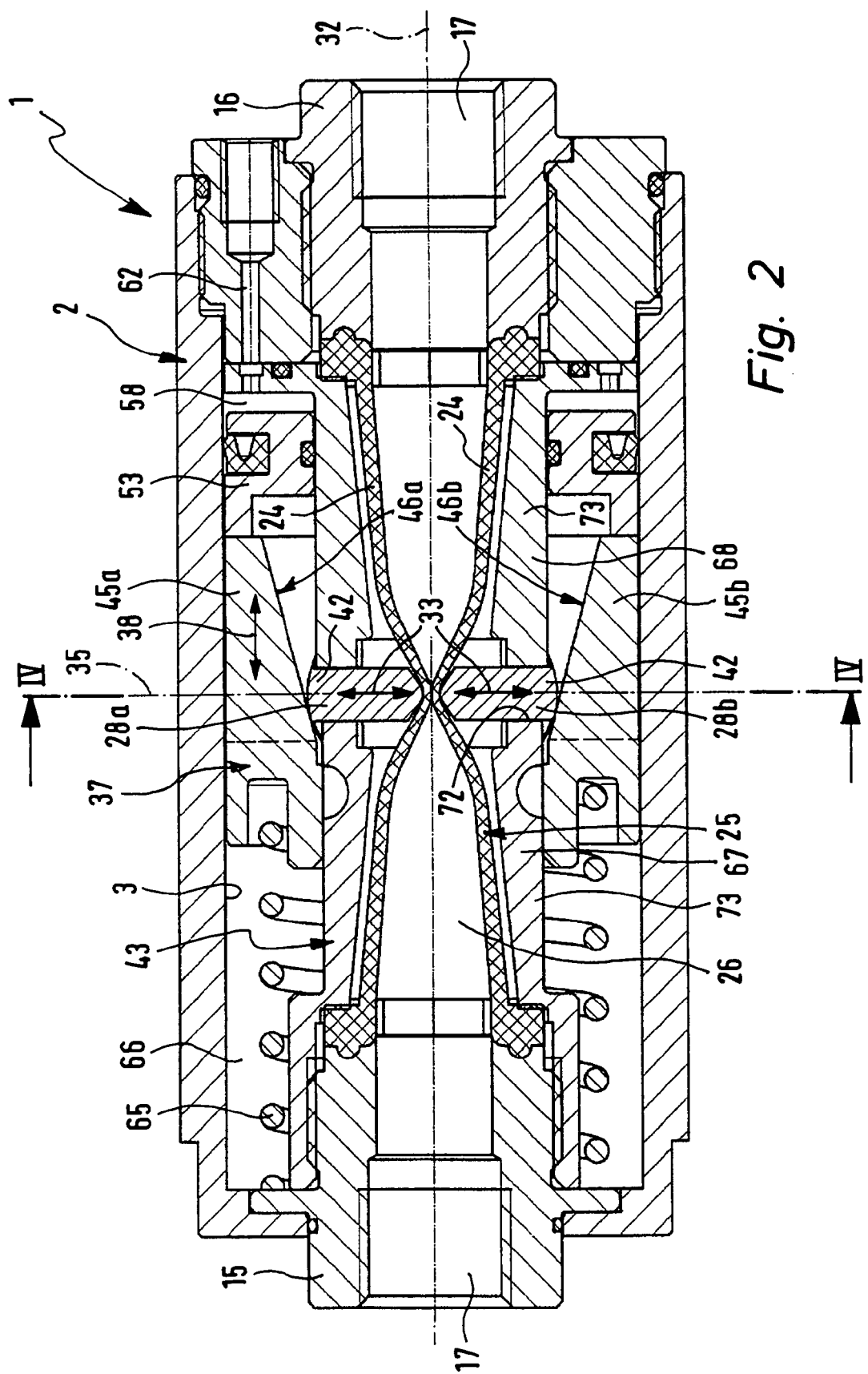
FIG. 2 shows the pinch valve of FIG. 1 in the closed position and in a longitudinal section taken on the section line II-II of FIG. 4.

In the home position illustrated in FIGS. 1 and 2 the two pinch elements 28a and 28b are shifted away from each other as far as possible in the direction of the operating movements 33 so that the peripheral wall 24 is not radially pinched or only pinched slightly and the cross section so made available for flow in the through duct 26 is at a maximum.

The pinch elements 28a and 28b may be so far shifted together with a pinching of the peripheral wall 24 that they assume the end position depicted in FIGS. 2 and 4 resulting from the fact that the peripheral wall 24 is pinched to the maximum extent and the wall sections 36a and 36b, opposite to each other in the direction of the operating movements 33, of the peripheral wall 24, which are acted on by the two pinch elements 28a and 28b, are thrust together in a fluid-tight fashion. The fluid passage through the through duct 26 is accordingly completely closed and the valve member 25, which in FIGS. 1 and 3 was wide open, is now in the closed position.

Intermediate positions of the pinch elements 28a and 28b between the home position and the end position render possible a stepless setting of different flow cross sections lying between the wide open position and the closed position of the valve member 25.

The pinch elements 28a and 28b have the setting force, which is necessary for performing the operating movements 33, applied to them by an actuating ring generally referenced 37. This ring assumes a position coaxially surrounding the valve member 25. It is able to be shifted in the direction of the valve member longitudinal axis 32 to perform an actuating movement 38, indicated by a double arrow, in relation to the valve housing 2 and to the valve member 25, it cooperating with the outer end sections 42, of the pinch elements 28a and 28b, facing away from the valve member 25.

The actuating ring 37 is located in the working space 3. The space is annular in form and is delimited in a radially outward direction by the peripheral valve housing wall 5 and radially inward by a sleeve-like support means 43 coaxially surrounding the valve member 25. The support means 43 extends between the two axial end sections of the valve housing 2 and its purpose includes radially supporting the valve member 25 at least at its flexible peripheral wall 24 and preventing undesired inflation owing to fluid pressure obtaining in the through duct 26. The inner shape of the sleeve-like supporting means 43 matches the outer shape of the peripheral wall 24 of the valve member 25 which is to exist when the pinch elements 28a and 28b are in their home position as in FIGS. 1 and 3.

The actuating ring 37 has its inner periphery sliding on the outer periphery of the supporting means 43 and/or its outer periphery sliding on the inner periphery of the peripheral valve housing wall 5. The function of a guide element cooperating with the supporting means 43 in this case is performed by an annular base body 44 of the actuating ring 37 which is arranged between on the one hand the two pinch elements 28a and 28b and on the other hand one of the axial end sections of the valve housing 2. From this base body 44 there extend axially outward on the side facing the pinch elements 28a and 28b, two actuating vanes 45a and 45b, which are diametrally opposite each other as related to the valve member longitudinal axis 32, such vanes radially outwardly axially overlapping one of the pinch elements 28a and 28b. On the inner side, facing the valve member longitudinal axis 32, each actuating vane 45a and 45b has an actuating face 46a and 46b extending in the direction of the actuating movement 38 but however at a slant in relation to the valve member longitudinal axis 32, such face touching the radially outwardly orientated and preferably at least partially convex, of the outer end section 42 of the associated pinch element 28a and 28b. Preferably the actuating faces 46a and 46b are flat with a component of their extent parallel to the longitudinal axis 34. The distance of the actuating face 46a and 46b from the valve member longitudinal axis 32 increases toward the free end of the actuating vane 45a and 1045b.

The actuating movement 38 of the actuating ring 37 possesses an activating means 47 orientated toward the pinch elements 28a and 28b and a deactivating means 48. On shifting in the activating direction 47 the pinch elements 28a and 28b are gradually shifted toward their terminal position as shown in FIGS. 2 and 4. If the actuating ring 37 is shifted in the deactivating direction 48 the pinch elements 28a and 28b are pushed radially outward owing to the peripheral wall 24 expanding under the fluid pressure in the through duct 26 toward the home position.

Thus axial positioning of the actuating ring 37 can be employed to set the flow cross section made available by the through duct 26 and accordingly the flow rate of the fluid to be controlled.

The drive force responsible for the actuating movement 38 may be applied using drive means 52, separate from the actuating ring 37, of the pinch valve 1. Preferably such drive means 52 are designed for the application of a fluid drive force, the fluid force preferably being supplied by compressed air at a suitable pressure.

The pinch valve 1 may be so designed that drive fluid supplying the drive force may act directly on the actuating ring 37. Preferably however a design is employed in which the drive fluid acts on a drive piston 53 separate from the actuating ring 37 and cooperating for its part mechanically with the actuating ring 37.

Preferably the drive piston 53 is mounted on the axial side, opposite to the actuating ring 37, of the two pinch elements 28a and 28b. It is designed in the form of an annular piston which coaxially surrounds the valve member 25 and the supporting means 43 encircling it and is able to be driven to perform a drive movement 55, indicated by a double arrow, in the direction of the valve member longitudinal axis 32.

The end face 56 of the drive piston 53 facing the actuating ring 37 may press against the actuating ring 37. In the present case this takes place owing to touching contact between the above mentioned end faces 57 of the actuating vanes 45a and 45b and the opposite facing face 56. In this respect it is preferably a question of a loose contact without a permanent connection. Theoretically therefore the drive piston 53 may move independently from the actuating ring 37, this permitting relative movements and excluding any mutual interaction likely to cause wear.

The drive piston 53 delimits a drive chamber 58 lying on the axis side opposite to the actuating ring 37, such chamber being part of the working space 3. As a consequence the drive chamber 58 as well is annular in design. By way of a control duct 62 opening into it the drive chamber 58 may be subjected to a controlled pressure of drive fluid to entail a drive movement 55 in the one or the other direction and accordingly also the resulting actuating movement 38 of the actuating ring 37.

The limit of the drive chamber 58 axially opposite to the drive piston 53, is defined by the terminating element 13.

The control duct 62 preferably opens axially opposite to the drive piston 53 into the drive chamber 58. The opposite opening 63 of the control duct 62 is located on the outer face of the valve housing 2 and in particular on the end face of the terminating element 13. Here the duct opening 63 may be provided with connection means 64, which for example are constituted by a female thread and permit the connection of a fluid line to supply and/or let off drive fluid. For control as a rule an electrically controlled control valve means is utilized selectively producing a connection of the control duct 62 with the atmosphere or with a source of pressure, which is however not illustrated in detail.

Annular seal means 54a and 54b borne by the drive piston 53 and able to slide on the inner face of the peripheral valve housing wall 5 and on the outer face of the sleeve-like supporting means 43, are provided in order to prevent fluid transfer to the actuating ring 37.

In principle it would be possible to provide a permanent connection between the actuating ring 37 and the drive piston 53 or to design such two components in an integral fashion. Owing to the separation however there is not only the advantage of the kinematic decoupling but also the facilitation of fitting on the sleeve-like supporting means 43.

In the working embodiment the drive piston 53 can only exert thrust forces effective in the deactivation direction 37. Forces in the opposite direction can not be applied by it to the actuating ring 37. For the drive force in the activation direction 47 there is conveniently a spring means 65 also accommodated in the working space 3 and preferably in the form of a mechanical spring means and in particular a compression spring means. A fluid spring could also be utilized here and in particular a pneumatic spring.

The spring means 65 is accommodated in a spring chamber 66, viz. a part of the working space 3 which is located axially between the actuating ring 37 and the floor wall 6.

The spring means 65 is arranged coaxially in relation to the valve member longitudinal axis 32 and surrounds the sleeve-like supporting means 43. At one axial end it bears against the valve housing 2 at the floor wall 6 and at the other axial end it bears against the actuating ring 37. Accordingly the actuating ring 37 is always acted upon in the activation direction 47 by the spring means 65 and therefore with the effect of compression of the valve member 25. If therefore the valve member 25 is to be pinched in the closing direction, this can be made possible by letting off drive fluid from the drive chamber 58, since this renders possible retreat of the drive piston 53. The consequence of this is also the advantage that the valve member 25 is automatically squeezed into the closed position, if owing to faulty functioning the fluid pressure obtaining in the working chamber 58 should drop.

In order to open the valve member 25 the working fluid is so let into the drive chamber 58 that the drive piston 53 is shifted in the deactivating direction 48 and pushes back the actuating ring 37 against the force of the spring means 65.

The support means 43 is terminally fixed to the housing at the two unions 15 and 16. Preferably it comprises two axially sequentially following coaxially lined-up support sleeves 67 and 68 axially spaced apart and coaxially aligned with the formation of a guide gap 72 with the pinch elements 28a and 28b in it. In this guide gap 72 the pinch elements 28a and 28b are guided in the direction of their operating movements 33. Preferably each support sleeve 67 and 68 comprises a support section 73 terminally delimiting the guide gap 72 and surrounding the valve member 25 and a holding section 74 constituting the end section axially opposite to the guide gap 72.

Preferably the holding section 74 associated with the floor wall 6 is in the form of an internally threaded stub pipe, by way of which it is screwed on a male thread of the union 15 extending into the body axially.

The holding section 74 of the other support sleeve 68 is preferably designed like a flange bearing against the facing end face of the terminating element 13. The duct 62 also extends through this flange-like holding section 74.

The end faces, delimiting the guide gap 72, of the two support sleeves 67 and 68 are each provided with a one linear guide structure 75 aligned with the operating movements 33. This structure may in particular have two diametrally opposite axial projections 77.

The pinch elements 28a and 28b are for their part provided on the side facing the first linear guiding structures 75 with a respective second linear guiding structure 76 complementary to the first linear guiding structure 75. This guide structure 76 here in the example comprises a slot-like axial recess 78 extending respectively in the direction of the operating movement 33 and having the opposite axial projection 77 extending into it in a sliding manner.

Accordingly the pinch elements 28a and 28b make a sliding linear engagement with the support sleeves 67 and 68 owing to the cooperation of the first and the second linear guide structures 75 and 76. This sliding engagement permits the performance of the operating movements 33 while simultaneously providing for securing the pinch elements 28a and 28b in the direction of their longitudinal axes 34.

Accordingly it is possible to ensure that the pinch elements 28a and 28b do not run askew during the operating movements 33 and also that they always assume the desired relative position in relation to the valve member 25.

In the case of the valve member 25 it is preferably a question of a molding which is rubber-elastic at least at its peripheral wall 24 and preferably throughout. Preferably it is a question of an integral body fabricated of a material with rubber-like elastic properties such as rubber or an other elastomeric material. It may therefore be produced at quite an economic price.

For securing it in the pinch valve 1 the valve member 25 preferably has a radially projecting attachment flange 82 at each of its two end section. The elastically deformable peripheral wall 24 is joined to them, in particular integrally.

The two attached flanges 82 respectively bear in the axial direction on the facing end face 83 of the respectively adjacent union 15 and 16. There is here a flush alignment and a direct transition between the through duct 26 and the two fluid ducts 17.

For securing the attachment flanges 82 in an axially fixed manner they are respectively clamped between on the one hand the said end face 83 and on the other hand the associated support sleeve 67 and 68 axially. In the transition zone between the support section 73 and the holding section 74 each support face 67 and 68 possesses an axially aligned annular clamping face 84 which results from a step and acts on the associated attachment flange 82 pushing toward the union 15 and 16. Further attachment means besides this clamping connection are not necessary for securing the valve member 25 to the housing.

The clamping connection at the same time is responsible for a fluid-tight joint between the valve member 25 and each of the unions 15 and 16. Such connection may more particularly be released if the attachment flange 82 possesses a coaxial annular sealing bead 85 on the end side facing the end face 83, such bead fitting, and being thrust, into a complementary annular groove in the end face 83 of the union 15 and 16.

The valve member 25 is more particularly so designed that its peripheral wall 24 is an initial condition neither acted upon by the pinch elements 28a and 28b nor by the fluid simply owing to inherent dimensional stability it has a shape tapering from the two attachment flanges 82 toward the engagement zone of the pinch elements 28a and 28b. This is well illustrated in the longitudinal section in FIG. 1.

The tapering shape is preferably only present as regards the dimension in the direction of the operating movements 33. Perpendicular to this the dimensions may be constant throughout or only vary to a minimum degree.

For instance the valve member 25 may widen starting at the above mentioned engagement portion to either side like a trumpet.

Those wall sections 86 of the peripheral wall 24 acted upon by the pinch elements 28a and 28b may have a flattened form (FIG. 3), the flattened form also applying in the form not acted upon by the pinch elements 28a and 28b. This is a result of designing the valve housing as an inherently stable molding. As a consequence of this there is right from the start in the direction of the longitudinal axes 34 a relatively long linear contact portion 89 between the pinch elements 28a and 28b and the peripheral wall 24. A further result is a reduced deformation of the peripheral wall 24 during pinching.

The valve member in the form of a molding may also be employed in conjunction with other pinch valves lacking the configuration described herein and in the case of which the pinch elements present are activated in an another manner.

For the assembly of the pinch valves 1 it is an advantage for the internal parts inserted into the socket 4 to be put together as a cartridge-like subassembly 12 depicted in FIG. 6. The subassembly is pushed into the socket 4 with the union 15 to the fore, which is to be adjacent to the floor wall 6, through the assembly opening 8 and is bodily held in the socket by screwing in the connection element 13. In order to secure the actuating ring 37 in position despite actuating by the spring means 65, holding pins 87, extending athwart the valve member longitudinal axis 32, may be introduced between the support means 43 and the actuate vanes 45a and 45b. For anchoring the holding pins 87 in an interlocking manner the support means 43 may each have an anchoring groove 88 extending tangentially on the outer periphery.

The holding pins 87 are preferably only removed after the subassembly 12 has been inserted. For this purpose at the peripheral valve housing wall 5 (which furthermore preferably has a circularly cylindrical shape) the socket 4 may have suitable openings which are not visible in the drawing.

Generally the pinch valve preferably has a cylindrical configuration and is thus quite compact. Owing to the coaxial arrangement of the various components it is possible to have small radial dimensions in conjunction with a symmetrical application of forces and accordingly little liability to wear.

The invention claimed is:

1. A pinch valve comprising a hose-shaped valve member having a flexible peripheral wall and extending between two unions, said valve member defining a passage duct for a fluid and having arranged at its outer periphery two pinch elements which are opposite to each other diametrically as related to the longitudinal axis of the valve member and which are able to be shifted toward and away from each other for a greater or lesser pinching of the peripheral wall while performing an operating movement athwart the longitudinal axis of the valve member, and furthermore comprising an actuating member surrounding the valve member, said actuating member having actuating faces fitting radially outside over the pinch elements and being oblique in relation to the longitudinal axis of the valve member, said actuating member by performing an actuating movement being able to be shifted along the valve member in order to act on the pinch elements with its actuating faces for causing the operating movement of the pinch elements, wherein the pinch elements being capable of thrusting mutually opposite sections of the peripheral wall against each other in a fluid-tight manner in order to completely close the passage duct, wherein the actuating member is in the form of an actuating ring coaxially surrounding the valve member and located in an annular working space radially externally surrounded by a peripheral valve housing wall, and that drive means separate from the actuating ring are provided by which the actuating ring is able to be acted upon by a drive force in control of the actuating movement and wherein the pinch valve further comprises a spring means disposed in the annular working space, the spring means biasing the actuating ring against the pinch elements to move the pinch elements together thereby closing the passage duct in an absence of the drive force.

2. The pinch valve as set forth in claim 1, characterized in that the drive means are designed for driving the actuating ring under the control of fluid force.

3. The pinch valve as set forth in claim 2, characterized in that the drive means comprise an annular drive chamber formed axially adjacent to the actuating ring in the working space, said drive chamber being suitable for receiving fluid pressure and surrounding the valve member coaxially, and that the drive means further comprise at least one fluid control duct communicating with the drive chamber and rendering possible a controlled supply and/or removal of fluid to and from the drive chamber.

4. The pinch valve as set forth in claim 1, characterized in that the actuating ring has an annular base body from which on the side facing the pinch elements two actuating vanes extend axially on which the actuating faces are arranged.

5. The pinch valve as set forth in claim 4, characterized in that in the working space axially between the actuating ring and the drive chamber there is arranged an annular drive piston able to be axially shifted in the drive chamber by controlled fluid actuation, such drive piston coaxially surrounding the valve member and being arranged for drivingly cooperating with the actuating ring for causing the actuating movement thereof, wherein the drive piston cooperates with the actuating vanes in a driving manner for the actuation of the actuating ring.

6. The pinch valve as set forth in claim 5, characterized in that the drive piston acts on the end faces, which face it, of the actuating vanes.

7. The pinch valve as set forth in claim 1, wherein the spring means is a mechanical compression spring acting on the actuating ring in an axial direction.

8. The pinch valve as set forth in claim 7, wherein the mechanical compression spring is accommodated in a spring chamber, which is formed by a component of the working space, the actuating ring being located axially between the spring chamber and a drive chamber able to be subjected to fluid pressure action for operation of the actuating ring.

9. The pinch valve as set forth in claim 1, characterized in that the working space is circularly cylindrical and its shape lacks axial steps.

10. The pinch valve as set forth in claim 1, characterized in that the hose-like valve member, at least as regards its flexible peripheral wall, is coaxially surrounded by a sleeve-like support means opposing radial inflation of the valve member.

11. The pinch valve as set forth in claim 10, characterized in that the support means comprises two coaxially aligned support sleeves which are axially spaced apart with the formation of a guide gap, the pinch elements being guided in the guide gap for sliding motion radially in relation to the longitudinal axis of the valve member.

12. The pinch valve as set forth in claim 1, characterized in that the peripheral valve housing wall has a circularly cylindrical shape.

13. The pinch valve as set forth in claim 1, characterized in that the peripheral valve housing wall is constituted by a sleeve-shaped socket with the remaining valve components inserted into it from an end face.

14. The pinch valve as set forth in claim 13, characterized in that a plurality of valve components are collected together as a subassembly able to be inserted into the socket axially.

15. The pinch valve as set forth in claim 1, characterized in that at its two ends, respectively, the hose-like valve member has a radially projecting attachment flange supported axially on the adjoining union wherein a fluid duct runs through said union.

16. The pinch valve as set forth in claim 15, characterized in that the attachment flanges are supported axially on the adjoining union such that there is simultaneously involved an axial sealing engagement with the associated union.

17. The pinch valve as set forth in claim 1, characterized in that the valve member generally is in the form of a unitary molding manufactured of a material with rubber-elastic properties.

18. A pinch valve comprising a hose-shaped valve member having a flexible peripheral wall and extending between two unions, said valve member defining a passage duct for a fluid and having arranged at its outer periphery two pinch elements which are opposite to each other diametrically as related to the longitudinal axis of the valve member and which are able to be shifted toward and away from each other for a greater or lesser pinching of the peripheral wall while perform an operating movement athwart the longitudinal axis of the valve member, and furthermore comprising an actuating member surrounding the valve member, said actuating member having actuating faces fitting radially outside over the pinch elements and being oblique in relation to the longitudinal axis of the valve member, said actuating member by performing an actuating movement being able to be shifted along the valve member in order to act on the pinch elements with its actuating faces for causing the operating movement of the pinch elements, wherein the pinch elements being capable of thrusting mutually opposite sections of the peripheral wall against each other in a fluid-tight manner in order to completely close the passage duct, and wherein the actuating member is in the form of an actuating ring coaxially surrounding the valve member and located in an annular working space radially externally surrounded by a peripheral valve housing wall, and that drive means separate from the actuating ring are provided by which the actuating ring is able to be acted upon by a fluid drive force in control of the actuating movement, wherein the drive means comprise an annular drive chamber formed axially adjacent to the actuating ring in the working space, said drive chamber being suitable for receiving fluid pressure and surrounding the valve member coaxially, and wherein the drive means further comprise at least one fluid control duct communicating with the drive chamber and rendering possible a controlled supply and/or removal of fluid to and from the drive chamber, and wherein the control duct opens at an outer face of the valve housing of the pinch valve and its duct opening at this position is provided with connection means for a fluid line supplying and/or removing the drive fluid, the drive fluid being independent of the fluid flowing through the valve member.

19. The pinch valve as set forth in claim 18, characterized in that in the working space axially between the actuating ring and the drive chamber there is arranged an annular drive piston able to be axially shifted in the drive chamber by controlled fluid actuation, such drive piston coaxially surrounding the valve member and being arranged for drivingly cooperating with the actuating ring for causing the actuating movement thereof.

20. The pinch valve as set forth in claim 19, characterized in that the actuating ring is a separate component independent of the drive piston and bearing axially against the drive piston.

21. The pinch valve as set forth in claim 20, characterized in that the actuating ring is bearing axially against the drive piston without being fixedly connected thereto.

22. A pinch valve comprising a hose-shaped valve member having a flexible peripheral wall and extending between two unions, said valve member defining a passage duct for a fluid and having arranged at its outer periphery two pinch elements which are opposite to each other diametrically as related to the longitudinal axis of the valve member and which are able to be shifted toward and away from each other for a greater or lesser pinching of the peripheral wall while performing an operating movement athwart the longitudinal axis of the valve member, and furthermore comprising an actuating member surrounding the valve member, said actuating member having actuating faces fitting radially outside over the pinch elements and being oblique in relation to the longitudinal axis of the valve member, said actuating member by performing an actuating movement being able to be shifted along the valve member in order to act on the pinch elements with its actuating faces for causing the operating movement of the pinch elements, wherein the pinch elements being capable of thrusting mutually opposite sections of the peripheral wall against each other in a fluid-tight manner in order to completely close the passage duct, and wherein the actuating member is in the form of an actuating ring coaxially surrounding the valve member and located in an annular working space radially externally surrounded by a peripheral valve housing wall, and that drive means separate from the actuating ring are provided by which the actuating ring is able to be acted upon by a drive force in control of the actuating movement, wherein the hose-like valve member, at least as regards its flexible peripheral wall, is coaxially surrounded by a sleeve-like support means opposing radial inflation of the valve member, and wherein the support means comprises two coaxially aligned support sleeves which are axially spaced apart with the formation of a guide gap, the pinch elements being guided in the guide gap for sliding motion radially in relation to the longitudinal axis of the valve member, and wherein, at their mutually facing end faces the two support sleeves each possess a first linear guide structure for engaging a second linear guide structure arranged on the facing side of the pinch elements in a sliding manner such that the pinch elements are linearly guided in a sliding fashion in a direction radially with regard to the longitudinal axis of the valve member and are supported perpendicularly thereto.

23. A pinch valve comprising a hose-shaped valve member having a flexible peripheral wall and extending between two unions, said valve member defining a passage duct for a fluid and having arranged at its outer periphery two pinch elements which are opposite to each other diametrically as related to the longitudinal axis of the valve member and which are able to be shifted toward and away from each other for a greater or lesser pinching of the peripheral wall while performing an operating movement athwart the longitudinal axis of the valve member, and furthermore comprising an actuating member surrounding the valve member, said actuating member having actuating faces fitting radially outside over the pinch elements and being oblique in relation to the longitudinal axis of the valve member, said actuating member by performing an actuating movement being able to be shifted along the valve member in order to act on the pinch elements with its actuating faces for causing the operating movement of the pinch elements, wherein the pinch elements being capable of thrusting mutually opposite sections of the peripheral wall against each other in a fluid-tight manner in order to completely close the passage duct, and wherein the actuating member is in the form of an actuating ring coaxially surrounding the valve member and located in an annular working space radially externally surrounded by a peripheral valve housing wall, and that drive means separate from the actuating ring are provided by which the actuating ring is able to be acted upon by a drive force in control of the actuating movement, wherein at least as regards its flexible peripheral wall the hose-like valve member is in the form of a rubber-elastic molding, wherein the peripheral wall in its initial condition when not being acted upon by the pinch elements has a configuration tapering axially from the outside toward the engagement area of the pinch elements only owing to its own dimensional stability.

24. The pinch valve as set forth in claim 23, characterized in that the hose-like valve member in its entirety is in the form of a rubber-elastic molding.

25. The pinch valve as set forth in claim 23, characterized in that the peripheral wall of the valve member has a flattened configuration in the wall sections cooperating with the pinch elements.

* * * * *